US00RE34898E

United States Patent [19]

Turunen et al.

[11] E Patent Number: Re. 34,898

[45] Reissued Date of Patent: Apr. 11, 1995

[54] CERAMIC BAND-PASS FILTER

[75] Inventors: Aimo Turunen, Oulu; Pauli Nappa, Kempele, both of Finland

[73] Assignee: LK-Products Oy, Kempele, Finland

[21] Appl. No.: 139,982

[22] Filed: Oct. 19, 1993

Related U.S. Patent Documents

Reissue of:

[64] Patent No.: 5,103,197
Issued: Apr. 7, 1992
Appl. No.: 532,018
Filed: Jun. 1, 1990

[30] Foreign Application Priority Data

Jun. 9, 1989 [FI] Finland ..... 892855
Jun. 9, 1989 [FI] Finland ..... 892856

[51] Int. Cl.[6] ..... H01P 1/202; H01P 1/213

[52] U.S. Cl. ..... 333/206; 333/134; 333/202

[58] Field of Search ..... 333/202, 204–207, 333/246, 222, 219.1, 134; 455/78, 82

[56] References Cited

U.S. PATENT DOCUMENTS

| | | | |
|---|---|---|---|
| 4,028,652 | 6/1977 | Wakino et al. | 333/202 |
| 4,255,729 | 3/1981 | Fukasawa et al. | 333/202 |
| 4,423,396 | 12/1983 | Makimoto et al. | 333/204 |
| 4,431,977 | 2/1984 | Sokola et al. | 333/206 |
| 4,559,508 | 12/1985 | Nishikawa et al. | 333/202 |
| 4,692,726 | 9/1987 | Green et al. | 333/206 |
| 4,703,291 | 10/1987 | Nishikawa et al. | 333/202 |
| 4,716,391 | 12/1987 | Moutrie et al. | 333/206 |
| 4,740,705 | 4/1988 | Crewe | 250/423 F |
| 4,740,765 | 4/1988 | Ishikawa et al. | 333/206 |
| 4,742,562 | 5/1988 | Kommrusch | 455/78 |
| 4,761,624 | 8/1988 | Igarashi et al. | 333/206 |
| 4,800,347 | 1/1989 | Yorita et al. | 333/202 |
| 4,800,348 | 1/1989 | Rosar et al. | 333/202 |
| 4,821,006 | 4/1989 | Ishikawa et al. | 333/202 |
| 4,823,098 | 4/1989 | DeMuro et al. | 333/206 |
| 4,829,274 | 5/1989 | Green et al. | 333/202 |
| 4,879,533 | 11/1989 | de Muro et al. | 333/206 |
| 4,896,124 | 1/1990 | Schwent | 333/206 |
| 4,954,796 | 9/1990 | Green et al. | 333/206 |
| 4,965,537 | 10/1990 | Kommrusch | 333/202 |
| 5,010,309 | 4/1991 | Manssen et al. | 333/206 |
| 5,097,236 | 3/1992 | Wakino et al. | 333/175 |
| 5,103,197 | 4/1992 | Turunen et al. | 333/206 |
| 5,109,536 | 4/1992 | Kommrusch | 455/82 |
| 5,130,683 | 7/1992 | Agahi-Kesheh et al. | 333/203 |

FOREIGN PATENT DOCUMENTS

| | | | |
|---|---|---|---|
| 0208424 | 1/1987 | European Pat. Off. . | |
| 0364931 | 4/1990 | European Pat. Off. . | |
| 0401839 | 12/1990 | European Pat. Off. . | |
| 58-114503 | 7/1983 | Japan . | |
| 59-101902 | 5/1984 | Japan . | |
| 59-119901 | 7/1984 | Japan . | |
| 60-216601 | 10/1985 | Japan | 333/204 |
| 61-161806 | 7/1986 | Japan . | |
| 62-120703 | 6/1987 | Japan | 333/206 |
| 63-124601 | 5/1988 | Japan . | |
| 63-311801 | 12/1988 | Japan | 333/202 |
| 64-53601 | 3/1989 | Japan | 333/202 |
| 64-60006 | 3/1989 | Japan | 333/202 |
| 2139427 | 11/1984 | United Kingdom . | |
| 2184608 | 6/1987 | United Kingdom . | |
| 2212671 | 7/1989 | United Kingdom . | |

OTHER PUBLICATIONS

Matthaei et al, "Microwave filters, Impedence-Matching networks, and Coupling structures", McCraw-Hill, pp. 497–506, 1964.

Nagle, "High Frequency Diversity Receiver from the 1930's", Ham Radio, pp. 34–43, Apr. 1980.

Patent Abstract of Japan–vol. 12, No. 465(E–690)[3312] Dec. 7, 1988, 1 page.

*Primary Examiner*—Seungsook Ham
*Attorney, Agent, or Firm*—Darby & Darby

[57] ABSTRACT

A dielectric filter is formed from a block of ceramic material with holes extending from a top surface toward a bottom surface. At least the bottom, both ends and one side surface are coated with conductive material. Also, the interior surfaces of the holes are coated with conductive material to form transmission line resonators. The uncoated side surface has an electrode pattern which allows coupling to the filter and between resonators of the filter. The elevation of the electrodes on the side surface between the top and bottom determines whether the coupling is capacitive, mixed inductive and capacitive, or inductive.

37 Claims, 5 Drawing Sheets

FIG. 5A
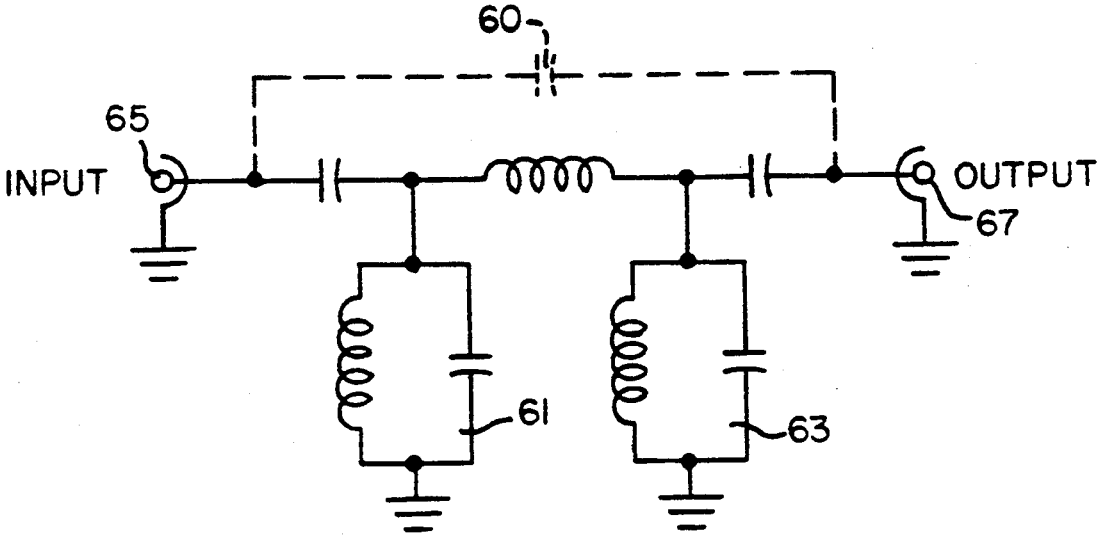
FIG. 5B
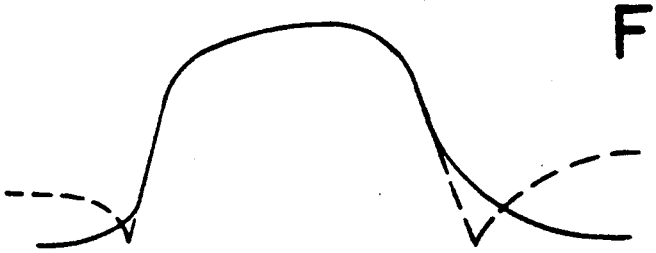
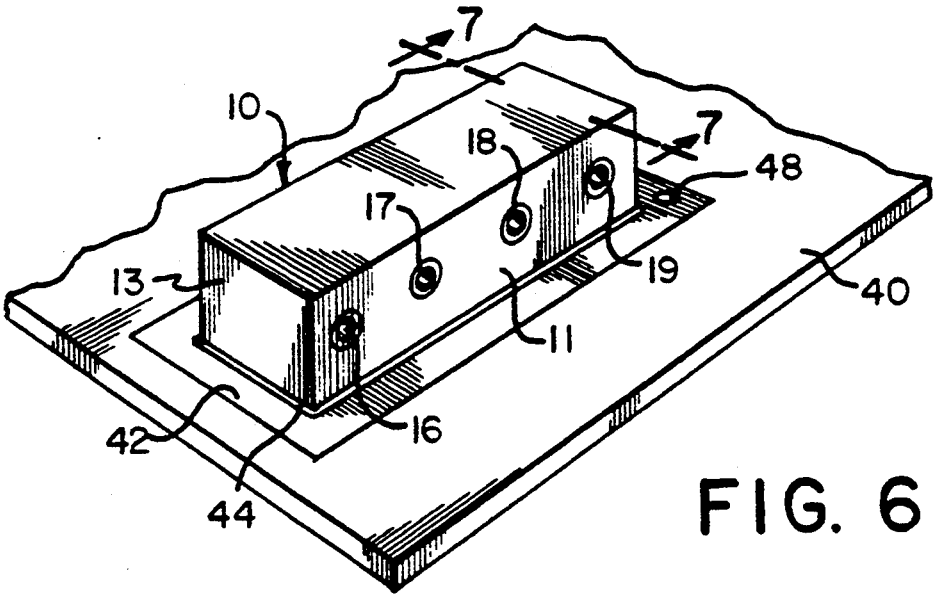
FIG. 6

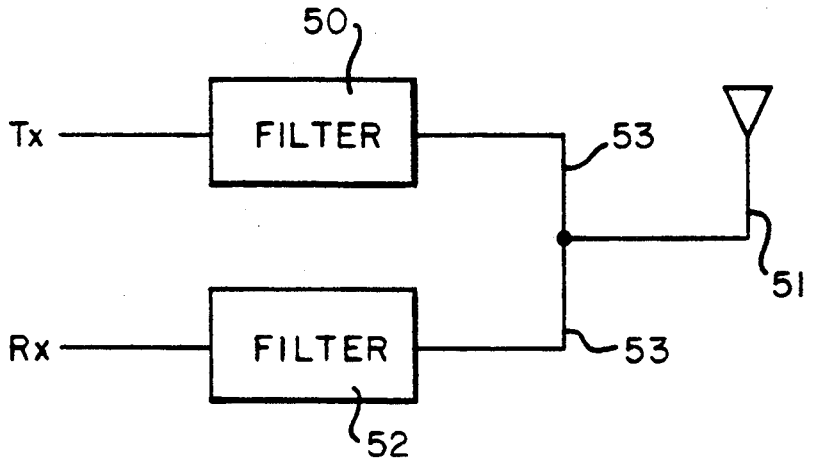
FIG. 10A
FIG. 10B
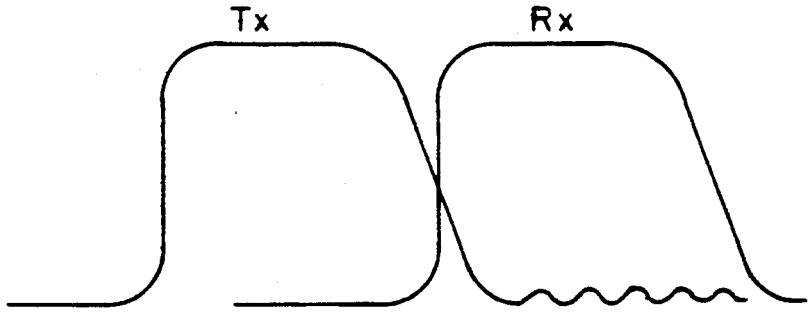
FIG. 10C
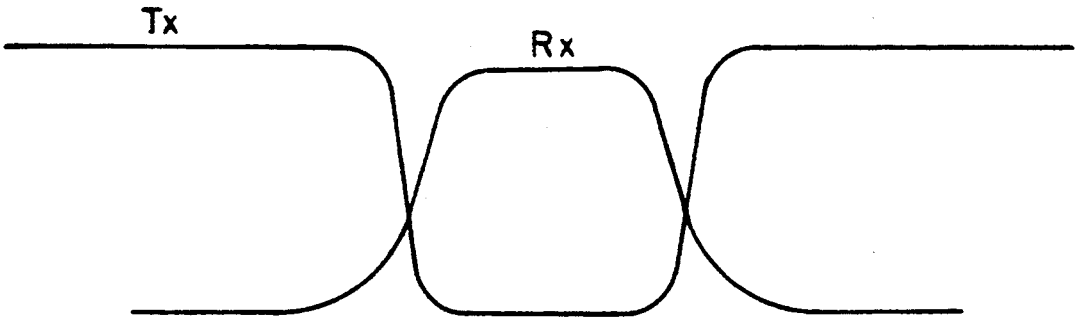

CERAMIC BAND-PASS FILTER

Matter enclosed in heavy brackets [ ] appears in the original patent but forms no part of this reissue specification; matter printed in italics indicates the additions made by reissue.

TECHNICAL FIELD

The present invention relates to radio frequency signal band-pass filters made of ceramic materials and, more particularly, to ceramic block band-pass filters which have different characteristics depending on the pattern of conductive material that covers the ceramic block.

BACKGROUND OF THE INVENTION

It is known, e.g., from U.S. Pat. No. 3,505,618 of McKee, that a radio frequency band-pass filter may be formed from a generally right parallelepiped body of dielectric material having top, bottom, side, and end surfaces. Holes are formed in the body extending from the top surface toward the bottom surface. A conductive material is coated over the most of the outer surfaces, except perhaps the top surface, and extends into the holes in order to form transmission line resonators. The conductive material in the holes is electrically connected to the conductive material on the bottom surface of the dielectric block. However, at the top surface the conductive material of the holes is not connected to the conductive outer coating. As a result, the resonators have a short circuit end toward the bottom surface of the dielectric block and an open circuit end at the top surface.

Means are provided for coupling a signal into and out of the endmost holes, e.g., by means of plug-type electrodes fitted into the open circuit ends of these holes. As an alternative to coupling into the dielectric block by means of plug-type electrodes, it is known to couple capacitively to the open circuit end of the resonator by means of conductive strips or electrodes formed on the top, end or side surfaces of the dielectric block. This type of coupling is described in U.S. Pat. Nos. 4,431,977 of Sokola et al., No. 4,692,726 of Green et al. and No. 4,716,391 of Moutrie et al. Conductive electrode pads that are isolated from the other conductive material, are coated on one of these surfaces of the dielectric material adjacent one of the resonator holes. An input or output lead is also connected to the pad. By locating the pad toward the open circuit end of the resonator, the signal on an input lead affects the electric field surrounding the open circuit end of the resonator, and capacitively induces a signal into the dielectric block. Alternatively, the pad at the output intercepts the electric field and picks up a signal from the block which it induces in the output lead.

In one embodiment disclosed in the Sokola et at. patent, an electrode is placed on an end surface near the short circuit end of the resonator. This electrode is coupled to the conductive material at the bottom of the block and an input lead is coupled to the electrode. As a result, the signal on the input lead forms a current that affects the magnetic field around the short circuit end of the resonator, and inductively induces a signal into the dielectric block. A similar output electrode and lead inductively pick up a signal from the block.

The bandwidth of a dielectric filter can be adjusted by changing the physical width of the dielectric block.

Fine adjustment of the bandwidth typically requires the dielectric body to be machined to some degree to set it at the optimal bandwidth. These filters are usually made of ceramic material formed in a mold. Since it is not practical to make blocks of different width in the same mold, changing the frequency the filter is designed for can be difficult and expensive.

It is known that coupling between the resonators also controls the bandwidth. U.S. Pat. No. 4,255,729 of Fukasawa et al. discloses a series of individual resonators coupled together to form a filter. The coupling into the endmost resonators and between resonators is achieved either by current carrying loops of wire near the short circuit end of each resonator, which produce inductive coupling, or by conductive plates positioned near the open circuit ends of each resonator, which produce capacitive coupling.

The above-identified Sokola et at., Moutrie et al. and Green et al. patents illustrate that magnetic coupling between resonators in a single dielectric block can be controlled by unplated or plated holes through the block at locations between the resonators, and by grooves or slots on the surface of the body. Inductive coupling is also controlled by varying the dimensions of the dielectric body (e.g. by machining it) and varying the distance between resonators during manufacture. Capacitive coupling can be controlled by electrode patterns on the top or open circuit surface of the block.

In addition to adjusting the inter-resonator coupling in order to control the filter characteristics, it may also be necessary to adjust the center frequency of the filter. The center frequency can be adjusted by changing the length of the resonators, i.e. the distance between the top and bottom surfaces when the resonator holes extend from one surface to the other. The relationship is as follows:

$$f_c = 300/l * \sqrt{e_r}$$

where $f_c$ is the frequency in megahertz, l is the length and $e_r$ is the relative dielectric constant of the dielectric material. Since the body of dielectric material is typically a ceramic that is compressed in a mold, the height of a block can be varied without changing molds by controlling the amount of material placed in the mold and by making sure the open side of the mold corresponds to the top or bottom surface of the block.

Another way of controlling the center frequency is by adding capacitance to the open circuit end of the resonators. See, Matthaei et al., Microwave Filters, Impedance-Matching Networks, and Coupling Structures, McGraw-Hill, pp. 497–506 (1964). In effect, this capacitance foreshortens the resonator in that it lowers the resonant or center frequency. This allows the length of the resonator for the desired frequency to shorter than that specified by the equation given above. This capacitance can be achieved by means of plates positioned above the open circuit ends of the resonators as shown in U.S. Pat. No. 4,028,652 of Wakino et al.

The capacitance can also be achieved by an electrode pattern on the open circuit surface of the dielectric block as shown in the Sokola patent. After the dielectric filter is formed the frequency can be adjusted by removing conductor material near the open circuit end to raise the frequency and at the short circuit end to lower the frequency. This is described in U.S. Pat. No. 4,800,348 of Rosar.

With the prior art techniques the coupling into and out of the filter structure, as well as between resonators in a single dielectric block, is generally either capacitive or inductive. Also, when this coupling is accomplished by electrode patterns on the dielectric block, the patterns are typically on the open circuit side. Because of the holes which open onto this side, the arrangement of patterns is limited. Further, electrode patterns on the open circuit side cannot create inductive coupling.

SUMMARY OF THE INVENTION

The present invention is directed to the creation of a band-pass filter made of a dielectric material, which filter has electrical properties that are easily adjusted over a wide range of values without altering the dielectric body of the filter or the dimensions of the mold used to produce the body. This is achieved by locating, at least in part, an electrode pattern for controlling inter-resonator coupling on a side surface of the dielectric block, instead of on the top surface.

An electrode pattern on the side of the dielectric block allows the inter-resonator coupling to be capacitive, inductive or mixed capacitive and inductive in the same filter block. In addition, coupling into or out of the block can also be achieved by means of electrodes on the side surface so that input/output coupling may also be capacitive, inductive or mixed. By utilizing the side surface of the dielectric block, the greatest surface area on the block and the area with the least number of obstructions, e.g. holes, is used for the electrode pattern.

As a result, the maximum amount of design flexibility is provided to the filter designer. With this design flexibility the designer can change the filter characteristics, e.g. the bandwidth and center frequency, by changing the electrode pattern on the side of the filter block and without changing the mold in which the block is cast or the physical dimensions of the finished block. All that has to be done is to change the mask used to apply the coating of conductive material.

Since mixed capacitive and inductive coupling can be used, the filter may be designed with imaginary zeros. Consequently, the number of resonators for equivalent performance can be reduced by about one-third. This allows for a corresponding reduction in the length of the filter.

In an illustrative embodiment of the filter a block of ceramic material is molded in the form of a parallelepiped with top, bottom, side and end surfaces. A number of holes, e.g. four (4) are created in the block extending from the top or open circuit surface toward the bottom or short circuit surface. The bottom surface, both end surfaces and one side surface are completely covered with conductive material. The top surface may be uncoated or it may be mainly covered with conductive material, except for an area around each hole which is left uncoated. Conductive material is coated inside the holes and is connected with the conductive material at the bottom surface to form four (4) transmission line resonators.

The uncoated side surface contains an electrode pattern that is used to achieve coupling into and out of the filter block, as well as to control coupling between the four (4) resonators. The pattern may take the form of loops located near the base of the input and output resonators, i.e. the endmost resonators. One end of each loop is connected to a lead, either an input or output lead, and the other end is connected to the conductive material near the bottom surface. This arrangement provides coupling into and out of the filter.

An electrode projecting from the loop extends from the top of the loop at the endmost resonators to the next resonators to provide inductive coupling between them. An isolated electrode pad is located between the two middle resonator to capacitively couple them. Further, electrode strips extend from the conductive material near the top to the conductive material at the bottom, and extend between the projecting electrodes and the pad. These strips control the amount of capacitive coupling achieved with the pad.

Conductive material is spaced at a distance from the side of the dielectric block with the electrode pattern. This material may be in the form of a conductor on the opposite side of a printed circuit board to which the filter is mounted or it may be a metal cover. When a printed circuit board is used, the conductive cover can be etched at the same time other patterns are formed. Further, instead of coating the electrode pattern on the side of the dielectric, it can be formed on the side of the printed circuit board in contact with the dielectric. This results in a savings in time in the formation of the filter.

If a metal cover is used over the electrode pattern, it may be assembled to the filter block in such a manner that the spacing or air gap between the side and the cover is adjustable. Adjusting the size of the air gap is another means of adjusting the bandwidth of the filter to fine tune it.

With the structure of the present invention, it is only necessary to alter the electrode pattern or coupling design on the side wall of the filter block in order to change the frequency response of the filter and the maximum points of attenuation formed at the upper and lower sides of the desired pass band of the filter. In practice this means that a few standard sizes of ceramic bodies or blocks can be used and, for a particular application, an electrode pattern is selected to create a filter with desired characteristics. Also, a much smaller filter can be formed.

BRIEF DESCRIPTION OF THE DRAWINGS

The foregoing and other features of the present invention will be more readily apparent from the following detailed description and drawings of illustrative embodiments of the invention in which:

FIG. 5A and 5B show an equivalent circuit of a two resonator band-pass filter with imaginary zeros and a transfer characteristic for the filter;

FIG. 6 is a perspective diagram of a still further embodiment of a band-pass filter mounted on a printed circuit board according to the invention;

FIGS. 10A–10C illustrate a block diagram of a duplexer filter structure and two transfer characteristics therefor.

DESCRIPTION OF ILLUSTRATIVE EMBODIMENTS

Figure 1:
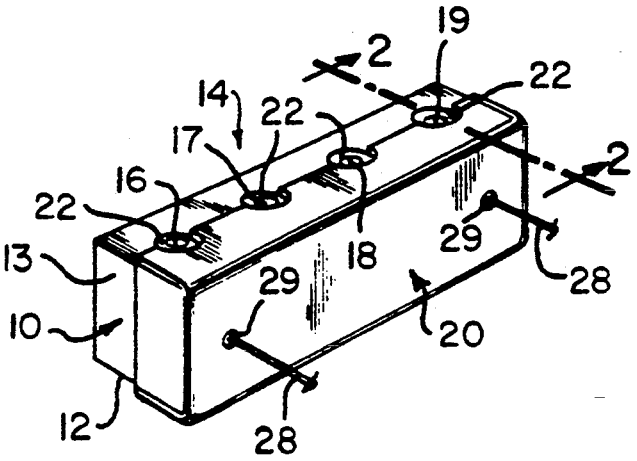
FIG. 1 is a perspective diagram of one embodiment of a band-pass filter according to the present invention.
Figure 2:
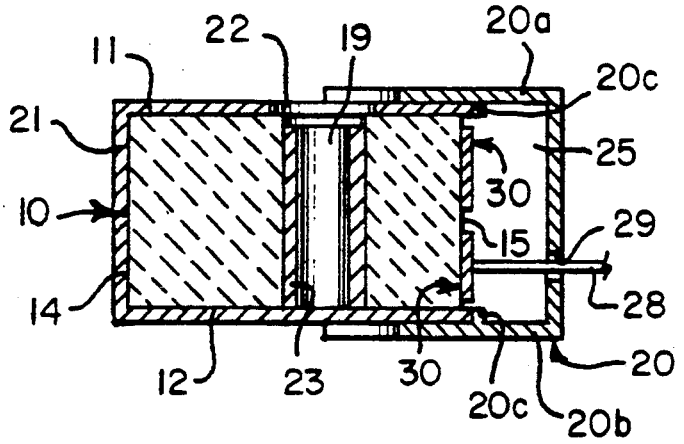
FIG. 2 is a cross-sectional view of the band-pass filter presented in FIG. 1, taken alone line 2—2.

FIG. 1 illustrates a ceramic band-pass filter according to one embodiment of the presented invention. FIG. 2 is a cross-sectional view of the filter taken along lines 2—2 in FIG. 1. The filter is made up of body 10, which is formed of a dielectric material that is selectively coated with a conductive material. The filter body 10 can be formed of any suitable type of dielectric material, e.g. a ceramic.

The shape of body 10 is substantially a right parallelepiped, i.e. its surfaces are rectangular. These surfaces include a top surface 11, a bottom surface 12, two end surfaces 13 and two side surfaces 14, 15. In addition, body 10 has four (4) holes 16, 17, 18 and 19 which are along the longitudinal axis of the body. These holes extend from the top surface 11 of the body toward the bottom surface 12. The bottom surface, the top surface and side surface 14 are completely plated with an electrically conductive layer of material 21, except for the circular area 22, surrounding each of the holes 16, 17, 18 and 19 on the top surface of the body. If desired, area 22 can be increased until there is no conductive material on the top surface 11. In addition, each of the holes 16–19 is plated with conductive material 23, in such a way that the plating 23 at the bottom end of the hole is connected to the plating 21 on the bottom surface 12. However, at the top end of the holes the plating 23 is not connected to the plating 23 on the top surface 11 of the body because of the uncoated area 22 around each hole at the top. Thus the holes 16–19 form quarter wavelength transmission line resonators with the top surface of the body being at the open circuit end of the resonators and the bottom surface being at the short circuit end.

When there is plating on the top surface 11, each plated hole 16–19 is capacitively coupled, at its open end, to the surrounding plating. This forms a foreshortened transmission line resonator. In particular, the length of each hole, and hence the height of the block, is less than a quarter wavelength of the resonant frequency of the resonator. Foreshortening can be avoided, however, by increasing the size of the uncoated area 22 until there is no conductive material on the top surface and the capacitance is effectively eliminated. The result will be that the height of the resonators, and hence the block, will have to be somewhat greater for a particular resonant frequency.

The filter structure illustrated is a quarter wavelength comb-line filter. For it to operate, there must be an imbalance in the electrical and magnetic coupling between the resonators. Foreshortening achieves this. However, with the present invention, this imbalance can also be achieved with the electrode pattern, so foreshortening is not necessary.

In a preferred embodiment of the invention, holes 16–19 are located off-center from the longitudinal axis of body 10 such that the holes are closer to the unplated side wall 15 of the body then to the plated side wall 14. On the unplated side wall 15 of the body, there are coupling designs 30 in the form of metal foil electrode patterns. These electrode patterns provide coupling into the filter, as well as coupling between the transmission line resonators.

Figure 3:
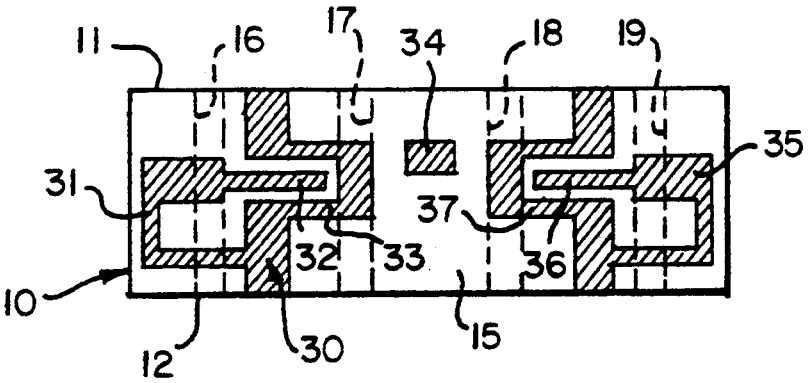
FIG. 3 is the electrode pattern coupling design used in the band-pass filter of FIG. 1.

FIG. 3 is an example of a coupling designs on the side surface 15 of the band-pass filter of the present invention. Inductive coupling to or from a resonator is achieved by an electrode strip design that is positioned adjacent the resonator at about the mid-point of its height. A portion of the strip extends to the conductive layer on the bottom surface 12 of the body. This kind of inductive coupling design is illustrated by coupling designs 31 and 35 in FIG. 3 which are adjacent the endmost resonators 16, 19. Lateral ground strip electrode designs 33 and 37 are also located on the side surface 15. These strips 33, 37 extend from the conductive layer 21 on the top surface to the conductive layer 21 on the bottom surface 12. Ground strip electrodes 33, 37 are offset toward holes 17 and 18, respectively. These strips tend to control the capacitive coupling between resonators. The inductive input/output strips 31, 35 are connected to respective ground strips 33, 37 near the bottom surface 12.

Purely capacitive coupling to a resonator or between two resonators can be achieved by using a detached conductive coupling pad, for example coupling design 34 in FIG. 3, which is located between resonators 17 and 18. Extensions 32 and 36 of inductive coupling designs 31 and 35, extend between the resonators 16 and 17 as well as resonators 18 and 19 to create a mixture of inductive and capacitive coupling between these resonators. This type of mixed coupling between two resonators can also be realized by simultaneously using separate inductive and capacitive coupling designs.

Inductive coupling is the greatest close to the bottom end of the resonator, where the magnetic field of the resonator is the strongest. On the other hand, the capacitive coupling is the greatest close to the top end of the resonator, where the electric field is the strongest. In this way, both inductive and capacitive coupling can be adjusted by either changing the size of the coupling design or by changing the elevation of the coupling design along the side surface 15. For example, the widening and elevating of the inductive coupling pattern, decreases the inductance of the design, thus decreasing the coupling to the resonator. Equivalently, increasing the size, of the capacitive coupling design or the elevating of its position, increases the coupling to the resonator.

The low end of the pass band can be affected by capacitive coupling and the high end of the pass band can be affected by inductive couplings. Since, by using inductive couplings, a low-pass type of filter can be achieved directly, the band-pass filter of the present invention can be realized with four transmission line resonators, while a minimum of six transmission line resonators was previously needed.

In prior filters, it was necessary in order to produce steep attenuation at the edge of the pass band, and hence improve the selectivity of the filter, to create zeros at the upper and lower edges of the pass band. These zeros were created by additional resonators. However, the mixed inductive-capacitive coupling achieved by electrodes 31, 32 or 35, 36 of the present invention permits the creation of imaginary zeros. Thus, the two extra resonators required in the prior art to form the zeros at the upper and lower side of the band, can be eliminated with the present invention and the overall size of the filter can be reduced.

The creation of imaginary zeros is actually a phase cancellation technique as described in Nagle, "High-Frequency Diversity Receiver From the 1930's", Ham Radio (April, 1980) pages 40–41. The basic idea is to have two coupling paths which, at a predetermine frequency, are opposite in phase, but equal in amplitude. In the present context there is magnetic coupling between the resonators through the dielectric body. To achieve phase cancellation, there is also coupling via electrodes 32, 36. These electrodes 32, 36 are arranged so that at particular frequencies, e.g. the upper and lower edges of the pass band, the signals travelling over the electrodes cancel the signals travelling through the body. This cancellation has the same effect as a band elimination filter or zero, but does not require a separate resonator. Hence it may be referred to as an "imaginary zero".

There can be more than two imaginary zeros. Also, instead of being located on either side of the pass band, they may all be located above or below the pass band.

FIG. 5A shows an equivalent circuit for a two resonator 61, 63 dielectric filter. FIG. 5B in solid lines shows the transfer characteristics for this filter. By utilizing the electrode pattern on the side surface, a capacitive connection 60 can be established between the input and output terminals 65, 67. The result of this capacitive coupling is to create imaginary zeroes at the edges of the pass-band. Thus, the transfer characteristic is changed to match that shown in dotted line in FIG. 5B. This sharpening of the pass-band due to the imaginary zero allows fewer resonators to be used.

If the connection of electrodes 31, 35 to ground strips 33, 37 is broken the input/output pattern becomes capacitive. This will change the position of the imaginary zeros, but they will still exist.

FIG. 3 is meant only to illustrate the use of the coupling designs on the side surface of body 10, and an exemplary shape. The shapes and sizes used in a particular application are determined by the desired electrical specifications and the desired method of realization of a particular filter.

In reference to FIG. 1 and 2, the side surface 15 of body 10 with the electrode pattern coupling designs on it, is covered with a moveable box-like metal cover 20, whose side surfaces, 20a and 20b are partially pushed onto the top and bottom surfaces 11, 12 of body 10 in contact with electrical conductive plating 21 which covers them. Thus cover 20 surrounds the side surface 15 which has the coupling design on its. The electrically conductive surface of the cover 20 is equivalent to plating 21. As a result, it provides a conductive cover on the side of the resonators and assures that the resonators function properly.

On the inner surface of the sides of cover 20 are shoulders 20c, which come against the side surface of the body 10, thus determining the distance between the inner surface of cover 20 and the side surface 15. In the primary embodiment of the invention, there is an air gap 25 between the cover 20 and the side surface 15. By moving cover 20 and changing the size of the air gap 25, the bandwidth of the band-pass filter can be adjusted. If desired, the air gap 25 can be partially or wholly filled with a suitable dielectric material.

In addition, in cover 20, there are one or more openings 29, through which coupling leads 28 extends inside the cover for connection to the coupling designs on the side surface 15 of body 10.

Figure 4:
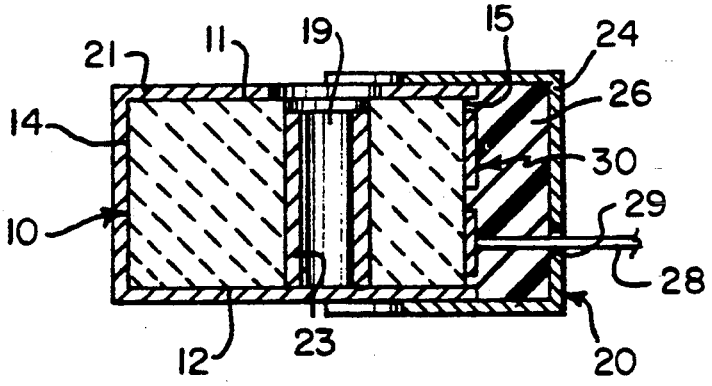
FIG. 4 is a cross-sectional diagram of the another embodiment of a band-pass filter according to the invention.

FIG. 4 presents a cross-sectional diagram of another embodiment of a band-pass filter according to the present invention. The filter of FIG. 4 is equivalent to the band-pass filter of FIGS. 1 and 2, and the same reference numbers used in FIGS. 1 and 2 are used in FIG. 4 to indicate the same elements. The embodiment of FIG. 4 differs from that in FIG. 2 in that the side surface 15 of body 10, which is equipped with the electrode pattern coupling designs 30, is first covered with a suitable layer 26 of dielectric material, e.g. Teflon ®. On top of this layer 26 of dielectric there is plated an electrically conductive metal film 24, which can be equivalent to plating 21 and which is formed simultaneously with plating 21. In addition, one or more openings 29' are left in the electrically conductive layer 24 and dielectric 26 to accommodate coupling leads 28.

In this case, the electrically conductive layer 24 has exactly the same effect as cover 20, presented in FIGS. 1 and 2. The bandwidth of the filter can, nevertheless, be adjusted only by changing the thickness of the dielectric material 26 during manufacture of the filter.

Figure 7:
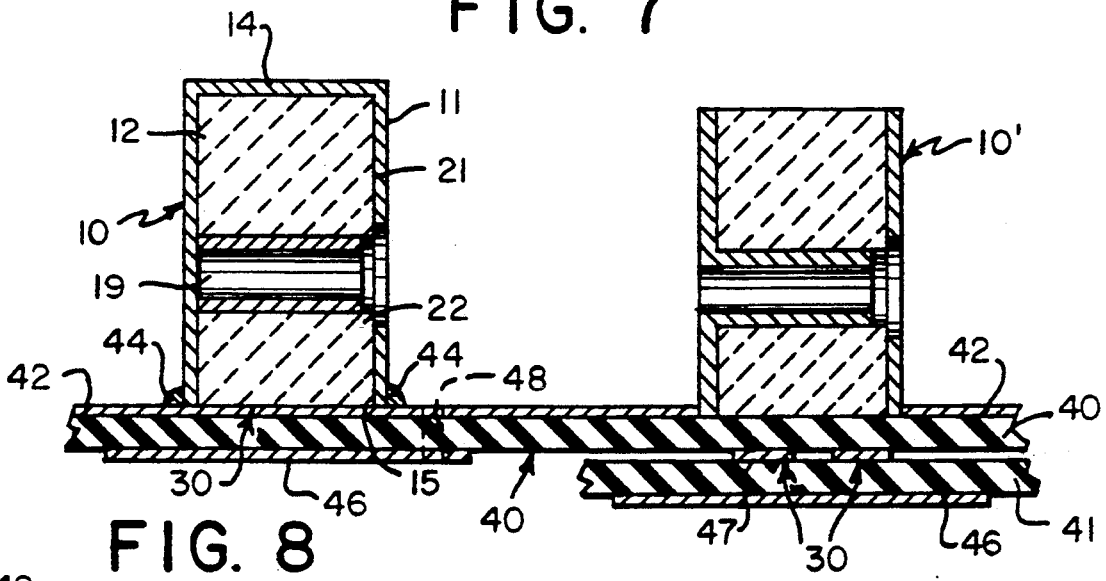
FIG. 7 is a cross-sectional diagram of the filter of FIG. 6, taken along line 7—7.

FIGS. 6 and 7 illustrate a still further embodiment of the invention in which the filter body or block 10 is mounted on its side on a printed circuit board 40. The filter block of FIGS. 6 and 7 are substantially the same as the block of FIGS. 1 and 2 and the same reference numbers will be used to indicate the same elements. In FIGS. 6 and 7 the body 10 of a band-pass filter according to the invention is formed of dielectric material that has been selectively plated with a layer of conductive material 21. The shape of body 10, the holes 16–19, and an electrode pattern 30 are all as in FIGS. 1 and 2. The difference, however, is that the block is mounted on its side 15 to printed circuit board 40. Thus, in terms of orientation in the drawings of FIG. 6 and 7, the top surface 11 (i.e. the resonator open circuit surface) is on the side and the uncoated side surface 15 is against the printed circuit board 443.

FIG. 7 presents a cross-sectional diagram, taken across the line 7—7, of the ceramic dielectric body of FIG. 6, as fixed to printed circuit board 40, which board could be any type of insulation plate, but which is economically a printed circuit board. Instead of having the electrode pattern 30 on the side 15 of the body 10, it may advantageous be provided on the surface of board 40 that is in contact with side 15.

The electrically conductive plating 21 on the ceramic body is economically coupled by a solder bead 44, to a conductive circuit pattern 42, which is located on the top surface of the board 40, substantially surrounding the perimeter of body 10. On the opposite side of the board from body 10, there is an area 46 of conductive material plated on the board. Area 46 is at least the size of the area of the side surface 15 of body 10 and forms an electrically conductive surface equivalent to plating 21 or cover 20 in FIG. 1 over the otherwise unplated side surface 15, so that the resonators 16–19 function properly. The conductive area 46 on the bottom side of the printed circuit board 40 in FIG. 7 is coupled to the conductive area 42 on the top of the board via a plated-through hole 48, and via a coupling of the plating 42 to plating 21 on body 10.

Figure 8:
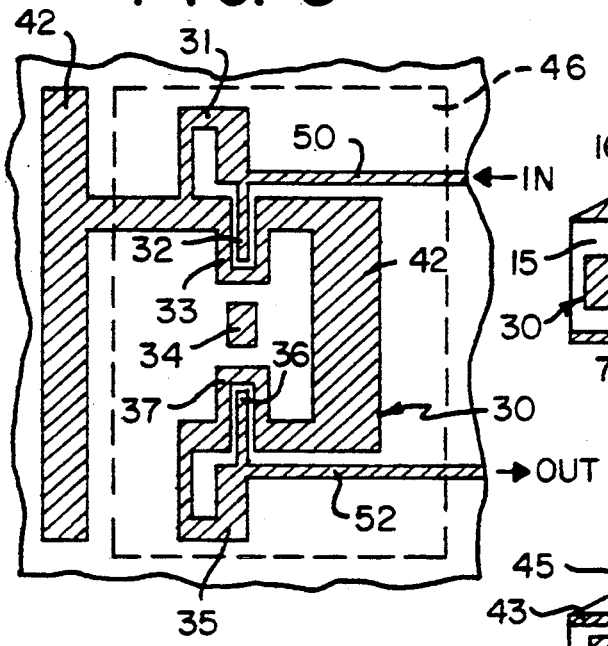
FIG. 8 presents the electrode pattern coupling design used with the band-pass filter of FIG. 7.

FIG. 8 illustrates an exemplary coupling designs 30 on the board 40 for a band-pass filter according to the present invention. Inductive coupling to the endmost resonators is achieved by strip line design 31, 35. Unlike the embodiment on FIGS. 1 and 2, there are no terminal pins 28. Instead leads 50, 52 form input and output lines, respectively, that are connected to one side of inductive patterns 31, 35, which are like those shown in FIG. 3.

The other sides of these patterns 31, 35 are grounded to the plating 42 on the printed circuit board and/or to the plating 21 on the surface of body 10. Purely capacitive coupling to the resonator or between two resonators is achieved with separate conductive coupling pads or islands, for example, of the type shown in FIG. 1 as pad 34, which pads are located between resonators 17 and 18 in FIG. 6. The extensions 32 and 36 of the inductive coupling designs 31 and 35, which extend between the resonators 16 and 17 as well as resonators 18 and 19 in FIG. 5 create the same mixture of inductive and capacitive coupling that may be used to form imaginary zeros as discussed with respect to FIG. 3.

As an alternative to the arrangement shown on the left side of FIG. 7, the printed circuit board 40 can be a multi-layer board 40, 41 as shown on the right side of FIG. 7. On the right side of FIG. 7 there are more than two conductive layers, i.e. layers 42, 46, 47 and the coupling designs 30 for coupling to the resonators are located on one of the center conductive layers 47 of the board. If, in this case, the metal plating 46' on the opposite side of the board, or on one of the center conductive layers of the multi-layer board that is farther away from the ceramic body than the above-mentioned coupling design, than the conductive layer 46' forms an electrical shield equivalent to conductive layer 46 on the left side of FIG. 7.

Instead of fastening body 10 to the board 40 by soldering, it can also be fastened, for example, by gluing or by a separate fixing bracket in which body 10 is mounted and which in turn is fastened to the board.

Figure 9A:
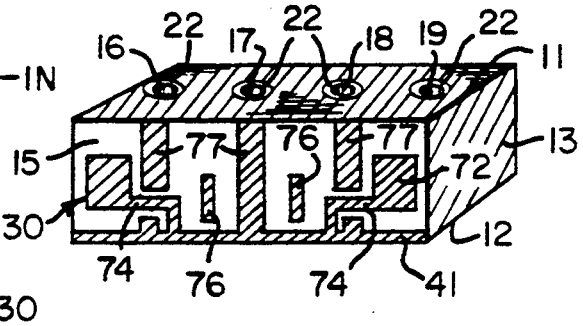
FIGS. 9A–9C illustrate different electrode patterns.
Figure 9B:
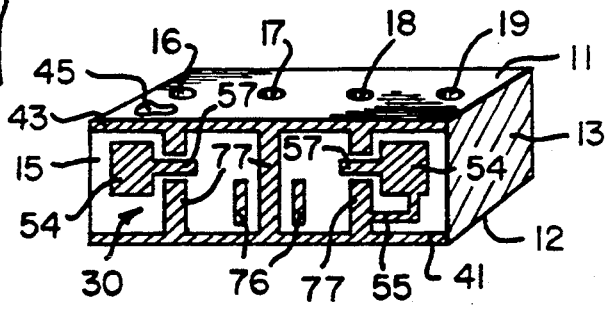
Figure 9C:
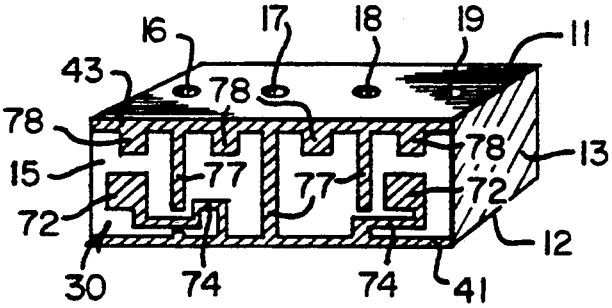

FIGS. 9A–9C show filters with different electrode patterns 30 for coupling to and between resonators. These structures also show electrode patterns which assist in tuning the various resonators to desired frequencies.

FIG. 9A illustrates a filter in which the top surface 11 is covered with conductive material, except for an area 22 around the open circuit end of each of the resonator holes 16–19. On the side surface which has the electrode pattern 30, there is a strip of conductive material 41 which extends along the bottom. The frequency of a particular resonator can be lowered by grinding or scratching away a portion of this conductive strip 41 adjacent the resonator. The frequency can be raised by adding additional conductive material to strip 41, for example, through the use of conductive paste or paint.

The arrangement shown in FIG. 9B not only includes conductive strip 41 at the bottom, but also a conductive strip 43 which runs along the top of the side surface. Removing conductive material from strip 43 adjacent the resonator raises the frequency of that resonator. Thus, with the arrangement of FIG. 9A, the resonators are designed to have a frequency slightly above the desired frequency. Final tuning is then achieved by scratching away some of conductor 41 to lower the frequency to the exact value desired. With the arrangement of FIG. 9B, the resonators are designed to have the exact frequency which is desired. If the frequency is a little low or a little high, in practice, the material can be moved from conductors 41 and 43, respectively, to tune the frequency exactly.

As an alternative, the frequency can also be reduced by removing a portion of the dielectric material from the top surface 11 adjacent the resonator. A gouging out of this material, as at 45, results in a increasing of the frequency. Further, by adding dielectric material adjacent a resonator on the upper surface 11, the frequency of the resonator can be lowered.

The pattern shown in FIG. 9C is basically the same as in FIG. 9A, except it includes strip 43 with tuning tabs 78. These tabs can be scratched off to affect tuning without disrupting the grounding strip 43. While these techniques for tuning the frequency of the resonators are preferred, other tuning techniques can also be used.

Two filters according to the present invention can be combined to form a duplex filter. A block diagram of such an arrangement is shown in FIG. 10A in which filter 50 is connected between a transmitter and an antenna 51 and a filter 52 is connected between a receiver and the antenna 51. The pass band of each of these filters is offset from each other such as shown, for example, in FIG. 10B, where the transmitter pass band is located below the receiver pass band. However, the opposite arrangement is also possible.

The connection 53 between the filters and the antenna 51 may be made a quarter wavelength long in order to achieve phase arid impedance matching. Alternatively, reactive components can be included in lines 53, so a full quarter wavelength line is not needed.

A reactive component for combining two filters to form a duplexer may be formed by a portion of the electrode pattern 30 on the side surface of one or both of the resonators. In such a case, the block of ceramic material may be mounted in a metal bracket and installed in a printed circuit board without the need for discrete reactive components. Also, if a quarter wavelength structure is needed for combining filters 50 and 52, this structure can be provided in the form of an electrode pattern on the sides of the dielectric blocks.

In addition to using two band-pass filters to achieve a duplexer structure, a band-pass and a band-stop filter may also be used. The transfer characteristic for this is shown in FIG. 10C. The advantage of using a band-stop filter is that it has the same insertion loss and isolation for the receiver band with three resonators, as does a four resonator band-pass filter. If the receiver pass-band filter is made using phase cancellation according to the present invention, only four resonators are needed, as opposed to the six resonators in a conventional band-pass filter. Thus, the duplexer structure using a band-stop arrangement has a total of seven resonators compared to twelve resonators using conventional band-pass arrangements.

The circuit pattern shown in FIG. 9A is an arrangement for a receiver band-pass filter of a duplexer, i.e. for filter 52 of FIG. 10A. The input and output pads 72 capacitively couple to resonators 16 and 19, respectively. They also provide inductive coupling between resonators 16, 17 and resonator 18, 19 by means of grounded strips 74. These connections create the phase cancelling phenomenon that results in imaginary zeros. Pads 76 are connected by an external wire and allow capacitive coupling between resonators 17 and 18. The grounded strips 77 help to limit capacitive coupling between various portions of the electrode, pattern 30.

The pattern of FIG. 9B is for the transmitter filter 50 of FIG. 10A. It has capacitive input terminals or electrode pads 54 at the input and output ends. The pad at the output end is shown connected to a ground strip via a conductive lead 55. This lead, however, is made small so that at radio frequencies it does not diminish the capacitive effect of pad 54. Strip 55 is preferably a quarter wavelength long so that it appears like an open circuit at the resonant frequencies, as is the pad 54 at the input.

By means of leads 57, capacitive coupling is provided between electrodes 16, 17 and 18, 19. Like the arrangement shown in FIG. 9A, there are small electrode strips 46 which can be connected by wire to form interresonator capacitive coupling as well as grounded electrode strips 47 which control coupling.

Figure 11A:
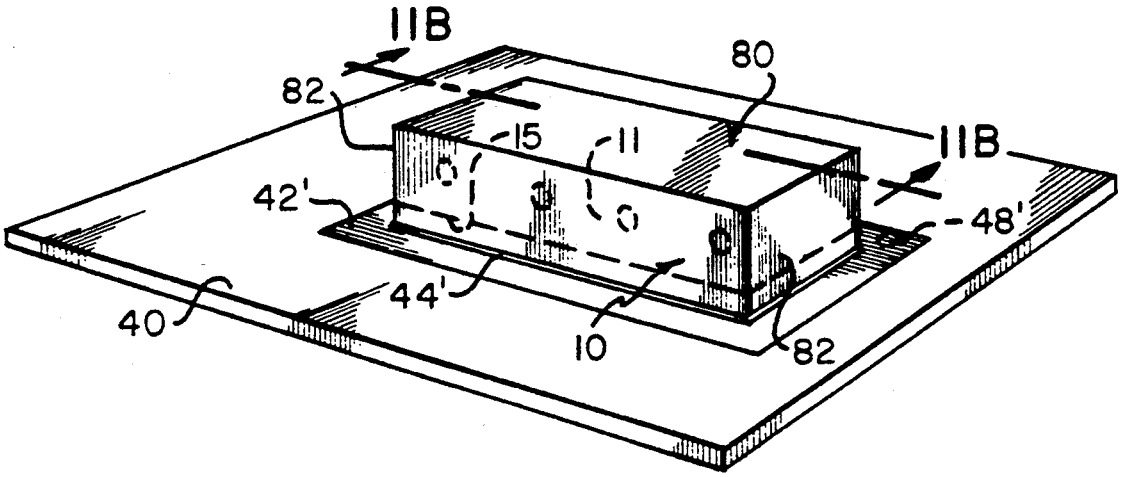
FIGS. 11A and 11B illustrate a technique for mounting a filter on a printed circuit board so as to form an air gap.
Figure 11B:
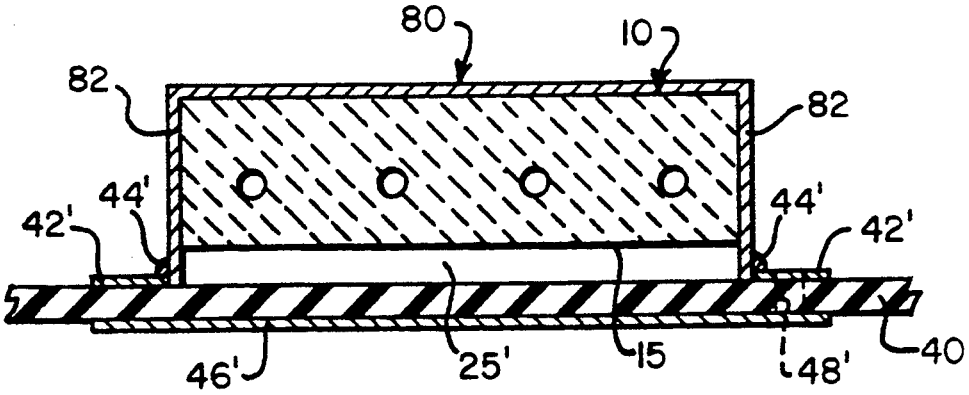

FIGS. 11A and 11B illustrate an alternative means for mounting the filter on a printed circuit board 40. In this arrangement the filter body 10 is in a metal casing 80 which is open at one side. The casing has side walls 82 which are longer than the width of the top wall 11 of the body. As a result, if the body 10 is at the upper end of the casing and the open end of the casing faces the printed circuit board, an air gap 25' is created between the side 15 of the body and the circuit board.

The casing 80 may be soldered to a conductor pattern 42 on the top of the printed circuit board or it may be glued to the printed circuit board. Also, the electrode pattern is on the side 15 of the body. A conductive layer 46' is provided on the bottom of the board 40 to cover side 15 and assure that the resonators function properly. This layer 46' is connected to the casing 80 via plated-through hole 48', conductor 42' and solder weld 44'.

The size of the air gap 25' and the thickness of the board 40 control the bandwidth of the filter.

As an alternative, the effect of pattern 46' can be achieved by extending pattern 42' under the casing 80. This alternative allows the pattern 46' and plated-through hole 48' to be eliminated.

While the present invention has been particularly shown and described with reference to preferred embodiments thereof, it will be understood by those skilled in the art that various changes in form and details may be made therein without departing from the spirit and scope of the invention.

We claim:

1. A filter comprising:

a body of dielectric material having (a) first and second surfaces on opposite sides of the body, (b) at least two side surfaces generally orthogonal to the first and second surfaces and connecting the edges of the first and second surfaces to each other, and (c) two end surfaces connecting the ends of the first, second and side surfaces to each other;

said body defining at least one hole with an interior surface which extends into said body from said first surface toward said second surface;

a conductive layer covering major portions of the second surface, one side surface of said body, both end surfaces, and the interior surface of said hole so as to form at least one transmission line resonator, the other side surface being generally free of said conductive layer; and an electrically-conductive electrode pattern means located on the other side surface of said body for providing electrical signal coupling to and from the transmission line resonator by creating a field that penetrates the uncoated other side surface of the body to the interior surface of the hole, the coupling varying from (a) capacitive to (b) mixed capacitive and inductive to (c) inductive, depending on the relative location of the pattern means on the side surface between areas adjacent the first surface to areas adjacent the second surface, respectively.

2. A filter as claimed in claim 1 wherein there are at least two holes in the body forming at least two resonators, said pattern means extending along the other side surface from the vicinity of one of the resonators to the vicinity of another and providing electrical coupling between the resonators.

3. A filter as claimed in claim 2 further including an input lead connected to said pattern means in the vicinity of one resonator, and an output lead connected to said pattern means in the vicinity of another resonator so as to couple a signal into said filter on said input lead and to couple the signal out of said filter on said output lead.

4. A filter as claimed in claim 1 further including an electrically-conductive plate spaced from said other side surface by a certain gap and being electrically connected to the conductive layer on the other surfaces of said body, said conductive plate at least in part covering said other side surface.

5. The filter as claimed in claim 4, wherein the conductive plate is formed by a box-like shaped metal cover located over the other side surface so as to leave an air gap between the other side surface and the cover.

6. The filter as claimed in claim 4, wherein said air gap is filled with an insulating material and said conductive plate is formed by a metal film located on the insulating layer.

7. The filter as claimed in claim 5, wherein the distance of cover from the other side surface of body is adjustable to change the size of the air gap, whereby the bandwidth of the filter is adjusted.

8. The filter as claimed in claim 6, wherein the bandwidth of the filter depends, in part, on the dielectric constant of the insulating material.

9. The filter as claimed in claim 6, wherein the bandwidth of the filter depends, in part, on the thickness of insulating material.

10. The filter as claimed in claim 6, wherein the insulating material is Teflon ®.

11. The filter as claimed in claim 5, wherein the cover has an inner surface that forms a cavity in which the body is retained, said cavity having shoulders projecting from the inner surface that engage the body to keep the inner surface of cover at the determined distance from the other side surface of the body.

12. The filter as claimed in claim 2, wherein there are four resonators, and further including a coupling electrode pattern located on said other side surface for coupling said resonators to create a phase cancellation with signals within the body so as to form at least one imaginary zero positioned so that the shape of the pass band of the filter is substantially equivalent to that of a band-pass filter with six resonators, but without an imaginary zero.

13. The filter as claimed in claim 6, wherein the insulating material is a printed circuit board, the filter body being mounted on the board with the other side surface toward the board, and the surface of the printed circuit board opposite the body being covered with the conductive plate.

14. A band-pass filter comprising:

a body of dielectric material having first and second surfaces on opposite sides of the body from each other, end surfaces and side surfaces;

said body defining at least two holes extending from the first surface toward the second surface;

a conductive coating on said second, end and one side surfaces as well as the interior surfaces of the holes, to form at least two transmission line resonators the other side surface being generally free of said conductive coating;

an insulating plate having first and second surfaces with the first surface against the other side surface of the body; and a conductive electrode pattern on the insulating plate for coupling between said two resonators, the electrode pattern providing coupling between the at least two resonators by creating a field that penetrates the uncoated other side of the body to the interior surface of the hole, said coupling being capacitive, mixed capacitive-inductive and inductive depending on whether the pattern is near and thereby closer to the first surface than to the second surface, or more equidistant between the first and second surfaces or near and thereby closer to the second surface than to the first surface, respectively.

15. The filter as claimed in claim 14, wherein the electrode patterns are on the first surface of said insulating plate against which the body is located.

16. The filter as claimed in claim 15, wherein the insulating plate is a multi-layer printed circuit board and the electrode patterns are in a conductive layer inside the multi-layer board.

17. The filter as claimed in claim 15, wherein, on the second surface of the insulating plate opposite from the body, at least in an area the size of the other side surface of the body, there is an electrically conductive plating that is electrically coupled to the conductive coating of body.

18. The filter as claimed in claim 14, wherein the body is fastened to the insulating plate by gluing.

19. The filter as claimed in claim 14, wherein the body is fastened to the insulating plate by soldering.

20. The filter as claimed in claim 14, wherein the body is mounted in a bracket which has been fastened to the insulating plate.

21. The filter as claimed in claims 1 or 14 wherein the first surface of the body is covered with the conductive layer, except for an area around the hole.

22. A filter as claimed in claims 1 or 14 wherein the electrode pattern includes a conductive strip connected to the conductive coating and located along at least one edge of the other side surface near one of the first and second surfaces, removal of a portion of said strip adjacent the resonator being effective to change the frequency of the resonator.

23. A filter as claimed in claim 1 or 14 wherein removal of a portion of the dielectric material on the first surface adjacent a resonator is effective to alter the frequency of the resonator.

24. A duplexer filter for a radio having an antenna, a transmitter and a receiver, comprising:

first and second blocks of dielectric material, each block having first and second surfaces on opposite sides from each other, end surfaces and side surfaces; each block defining at least one hole extending from the first surface to the second surface;

a conductive coating over the second surface, end surfaces and one side surface, as well as over the interior of the hole of each block, so as to form at least one transmission line resonator in each block the other side surface being generally free of the conductive coating;

a conductive electrode pattern on the other side surface of each block for coupling directly to and from the resonator through the dielectric in each block by means of fields created at the electrodes that penetrate the other side surface and extend to the hole, the coupling varying from capacitive, to mixed capacitive-inductive, to inductive as the pattern is located respectively on the other side surface near and thereby closer to the first surface than to the second surface, to more equidistant between the first and second surfaces, to nearer and thereby closer to the second surface than to the first surface and connecting means for connecting the first block between the transmitter and the antenna, and for connecting the second block between the receiver and the antenna.

25. A duplexer filter as claimed in claim 24 wherein the connecting means includes a portion of the electrode pattern on the other side surface.

26. A duplexer filter as claimed in claim 25 wherein the portion of the electrode pattern is an electrode strip one-quarter wavelength of the resonant frequency of the resonator in length.

27. A duplexer filter as claimed in claim 25 wherein the portion oft he electrode pattern forms a reactive component.

28. A duplexer filter as claimed in claim 24 wherein the electrode pattern for one of the blocks forms the block into a band-pass filter with at least one imaginary zero.

29. A duplexer filter as claimed in claim 24 wherein the electrode pattern for one of the blocks forms the block into a band-stop filter.

30. A duplexer filter as claimed in claim 24 wherein one of the first and second blocks has four holes and an electrode pattern that creates a four resonator band-pass filter with imaginary zeros at both sides of the passband, and the other block has three holes and an electrode pattern that creates a three resonator band-stop filter.

31. A filter comprising:

first and second blocks of dielectric material, each block having first and second surfaces on opposite sides from each other, end surfaces and side surfaces; each block defining one hole extending from the first surface to the second surface;

a conductive coating over the second surface, end surfaces and one side surface, as well as over the interior of the hole of each block, so as to form one transmission line resonator in each block the other side surface being substantially free of the conductive coating:

conductive electrode patterns on the other side surface of each block for coupling to and from the resonator in each block by means of fields created by signals on the electrode patterns that penetrate the other side surface and extend to the hole, the coupling varying from capacitive, to mixed capacitive-inductive, to inductive as the pattern is located respectively on the other side surface near and thereby closer to the first surface than to the second surface, to more equidistant between the first and second surfaces, to nearer and thereby closer to the second surface than to the first surface; and connecting means for connecting the first block to the second block between the receiver and the antenna.

32. A bandpass filter, comprising:

a body of dielectric material having a plurality of surfaces including two opposite surface; and a side surface extending between said two opposite surfaces, said body defining at least one hole with an interior surface which extends into said body from each of said two opposite surfaces;

resonator means for producing at least one transmission line resonator, said resonator means including a conductive layer covering portions of at least some of said plurality of surfaces and an interior surface of said hole;

means for providing electrical signal coupling to and from said resonator means, said providing means including an electrically-conductive electrode pattern means on said side surface which varies said coupling from capacitive to mixed capacitive and inductive to inductive, depending on a relative location of the pattern means on the side surface between areas of said side surface adjacent to said two opposite surfaces;

an electrically conductive plate spaced from said pattern means so as to define a gap therebetween which determines a bandwidth; and means for coupling said plate to said interior surface of said hole.

33. A bandpass filter as in claim 32, wherein said determining means including means for varying a size of said gap by enabling relative movement of said plate and said pattern means with respect to each other.

34. A bandpass filter as in claim 32, wherein said varying means includes a insulating element separating said pattern means from said plate, said bandwidth being determined partially based on a thickness and composition of said insulating element.

35. A bandpass filter as in claim 32, wherein said coupling is more capacitive than inductive.

36. A bandpass filter as in claim 32, wherein said coupling is more inductive than capacitive.

37. A bandpass filter as in claim 32, wherein said coupling provides mixed capacitance and inductance.

* * * * *